US008673052B2

(12) United States Patent
Shi et al.

(10) Patent No.: US 8,673,052 B2
(45) Date of Patent: Mar. 18, 2014

(54) PROCESS FOR PREPARING TANTALUM POWDER FOR CAPACITORS

(75) Inventors: Wenfeng Shi, Shizuishan (CN); Xueqing Chen, Shizuishan (CN); Yong Li, Shizuishan (CN); Xudong Xi, Shizuishan (CN); Tao Guo, Shizuishan (CN)

(73) Assignee: Ningxia Orient Tantalum Industry Co., Ltd., Shizuishan (CN)

(*) Notice: Subject to any disclaimer, the term of this patent is extended or adjusted under 35 U.S.C. 154(b) by 505 days.

(21) Appl. No.: 12/818,379

(22) Filed: Jun. 18, 2010

(65) Prior Publication Data
US 2010/0326239 A1  Dec. 30, 2010

(30) Foreign Application Priority Data
Jun. 25, 2009  (CN) .......................... 2009 1 0148628

(51) Int. Cl.
*B22F 9/20* (2006.01)
*B22F 1/00* (2006.01)
(52) U.S. Cl.
USPC ............................................. 75/369; 75/343
(58) Field of Classification Search
USPC .................................................. 75/343, 369
See application file for complete search history.

(56) References Cited

U.S. PATENT DOCUMENTS

| 6,136,062 A | 10/2000 | Löffelholz et al. |
| 2003/0070509 A1 | 4/2003 | Osako et al. |

FOREIGN PATENT DOCUMENTS

| CN | 1425524 A | 6/2003 |
| CN | 1449879 A | 10/2003 |
| CN | 101574741 A | 11/2009 |
| JP | 2003-129115 | 5/2003 |

OTHER PUBLICATIONS

Dialog File 351, World Patent Index Accession No. 2003-442970/200342 English language abstract and patent family for CN 1425524 A, published Jun. 25, 2003.
English language abstract for CN 1449879 A, published Oct. 22, 2003.
English language abstract for CN 101574741A, published Nov. 11, 2009.
English language abstract for JP 2003-129115, published May 8, 2003.
International Search Report for PCT/CN2010/000414, mailed Jul. 8, 2010, Chinese Patent Office, Beijing, China.

*Primary Examiner* — Rebecca Lee
(74) *Attorney, Agent, or Firm* — Sterne, Kessler, Goldstein & Fox P.L.L.C.

(57) ABSTRACT

The present invention provides a process for preparing a tantalum powder with high specific capacity, which process comprising the steps of, in sequence, (1) a first reduction step: mixing tantalum oxide powder and a first reducing agent powder homogenously, and then carrying out reduction reaction in hydrogen and/or inert gas or vacuum atmosphere to obtain a tantalum suboxides powder; (2) a second reduction step: mixing the tantalum suboxides powder obtained from the step (1), in which impurities have been removed, and a second reducing agent powder homogenously, and then carrying out reduction reaction in hydrogen and/or inert gas or vacuum atmosphere to obtain a tantalum powder having high oxygen content; (3) a third reduction step: mixing the tantalum powder having high oxygen content obtained from the step (2), in which impurities have been removed, with a third reducing agent powder homogenously, and then carrying out reduction reaction in hydrogen and/or inert gas or vacuum atmosphere to obtain a tantalum metal powder suitable for capacitors; wherein after each reduction step, the oxidation product of reducing agent and the residual reducing agent are removed from the reaction product.

7 Claims, 2 Drawing Sheets

PROCESS FOR PREPARING TANTALUM POWDER FOR CAPACITORS

TECHNICAL FIELD

The present invention relates to a process for preparing tantalum powder for capacitors, particularly to a process for preparing tantalum powder by reducing oxides of tantalum with rare earth metals or hydrides thereof.

PRIOR ART

Recently, with the demands of miniaturization and frequency enhancement of electronic devices and electronic circuits, tantalum capacitors have been continuously required to enhance specific capacity and reduce equivalent series resistance (ESR). So tantalum powder is required to be finer and have homogenous particle size, so as to enhance specific capacity. In order to further enhance the specific capacity of tantalum powder, more and more studies have been focused on the process for preparing tantalum powder.

It is well known that potassium sodium fluotantalate reduction is the most common process for preparing metal tantalum powder. In this process, the physical properties, such as particle size and specific surface area, of the tantalum powder are controlled by adding inert salts such as KCl, NaCl, KF and NaF. Increasing the amount of the inert salts would lead to the tantalum powder obtained becoming fine, i.e. increasing the surface area of formed metals. However, the production capability of tantalum metal during reduction process is correspondingly reduced with the increase of the concentration of inert salts. Generally, it is economic to employ potassium fluotantalate agitated with sodium reduction process to produce a powder for capacitors having less than 100,000 uFV/g specific capacity. If a tantalum powder having finer initial particle size is prepared, the ratio of diluents and/or agitation rate should be increased to cause aggregation at smaller extent. This renders that the reaction process is more difficult to be controlled, and the production cost is increased remarkably. Besides, this process results in tantalum powder with high energized voltage. This tantalum powder exhibits disadvantageous electrical properties.

Additionally, some patents have disclosed the preparation of tantalum powder by reducing oxides of tantalum with alkali metals, alkaline earth metals and hydrides thereof. However, such reaction is exothermal reaction, in which a great amount of heat is liberated, and high temperature is generated. The oxides directly contact with alkali metals or alkaline earth metals, and thus the reaction time is very short and the heat liberation amount is quite large, being uncontrollable reaction. However, the particle size of tantalum powder is controlled by reduction temperature, since the reaction temperature cannot be controlled thoroughly, the powders having particle size suitable for the manufacture of capacitors cannot be reproductively obtained. U.S. Pat. No. 6,136,062 discloses a process for preparing niobium powder and tantalum powder by reducing niobium oxide and tantalum oxide with metal magnesium, in the first reduction stage, the reduction is carried out by using a reducing agent in an amount of 1.25-5 times of the stoichiometric amount, until an average composition corresponded to $(Nb, Ta)O_x$ where $x=0.5$ to $1.5$, and before the second stage the reduction product from the first stage is washed with acids to remove excess reductive metals and the oxides of reductive metals generated in the reaction. Although tantalum powder with larger specific area can be prepared by this process, this process has following disadvantages: excess reducing agents are used and large amount of acids are required to use in washing with acids. Besides, this process includes two-stage reductions, and the reduction degree should be controlled strictly in the first-stage reduction, therefore, this process is complex in technology and low in efficiency.

CN1425542A discloses a process for preparing tantalum powder by reducing tantalum oxides with alkali or alkaline earth metals in two stages. However, this process requires very high corrosion resistance of equipments.

JP2003-129115 disclosed a process for preparing tantalum powder by reducing tantalum oxides with alkali, alkaline earth and/or rare earth metals in two stages. In the first stage, alkali and/or alkaline earth metals are substantially used to carry out vapor reduction, in the second stage, lower valence oxides of tantalum generated in the first stage are reduced with rare earth metals in liquid phase. However, the control of the first stage is quite complex. Therefore, this process of preparing tantalum powder with super-high specific capacity is not very successful.

CN1449879A disclosed a process for preparing nano-grade tantalum powder, wherein tantalum pentoxide and a reducing agent (such as sodium) are partially or all dissolved in liquid ammonia at a temperature lower than the liquidation temperature of ammonia ($-34°$ C.), the liquid ammonia solution with tantalum pentoxide dissolved therein and the liquid ammonia solution with a reducing agent dissolved therein are mixed to reaction and produce nano-grade tantalum powder, and then the products is separated and purified to provide pure nano-grade tantalum powder (20-60 nm). Tantalum powder stable in air is then obtained through a series of treatment measurements. However, the tantalum powder prepared by this process contains high content of three impurities of oxygen, nitrogen and sodium, and this process is complex in operation, high in cost, and thus industrialized production cannot be achieved.

Therefore, tantalum powder having homogenous particle size, low oxygen content and high specific capacity is still required in the field of capacitors.

SUMMARY OF THE INVENTION

This object is achieved in the present invention through the preparation of tantalum powder by reducing tantalum oxides with rare earth metals or hydrides thereof. The process according to the present invention is also suitable for the preparation of niobium and vanadium powders.

The present invention provides a process for preparing tantalum powder with super-high specific capacity by reducing tantalum oxide powder through three steps of reductions, which process comprising the steps of:

(1) a first reduction step: mixing tantalum oxide powder with a first reducing agent powder homogenously, and then carrying out reduction reaction in hydrogen and/or inert gas or vacuum atmosphere to obtain a tantalum suboxides powder; wherein said first reducing agent is selected from the group consisting of rare earth metals, hydrides of rare earth metals and mixtures thereof;

(2) a second reduction step: mixing the tantalum suboxides powder obtained from the step (1), in which impurities have been removed, with a second reducing agent powder homogenously, and carrying out reduction reaction in hydrogen and/or inert gas or vacuum atmosphere to obtain a tantalum powder having high oxygen content; wherein said second reducing agent is selected from the group consisting of rare earth metals, hydrides of rare earth metals and mixtures thereof;

(3) a third reduction step: mixing the tantalum powder having high oxygen content obtained from the step (2), in which impurities have been removed, with a third reducing agent powder homogenously, and then carrying out reduction reaction in hydrogen and/or inert gas or vacuum atmosphere to obtain a tantalum metal powder suitable for capacitors; wherein said third reducing agent is magnesium or magnesium alloy;

wherein after each reduction step, the oxidation product of reducing agent and the residual reducing agent are removed from the reaction product.

In present specification, rare earth metals include scandium, yttrium, lanthanum, cerium, praseodymium, neodymium, samarium, europium, gadolinium, terbium, dysprosium, holmium, erbium, thulium, ytterbium, lutetium, and can also be alloys or any mixtures thereof.

The third reducing agent is magnesium or magnesium alloy powders. The magnesium alloy comprises, in addition to magnesium, one or more elements selected from the group consisting of calcium, zinc and rare earth metals. The third reducing agent is preferably magnesium, yttrium-magnesium alloy, calcium-magnesium alloy, lanthanum-magnesium alloy, magnesium-zinc alloy.

In the first reduction reaction step, tantalum oxide powders are reduced by a first reducing agent, i.e. powders of rare earth metals or hydrides thereof. The amount of the first reducing agent is preferably adjusted to 0.3-0.65 times of the stoichiometric amount of the reducing agent required for removing oxygen content in tantalum oxide powder, and the oxides formed from the first reducing agent or the residual first reducing agent are preferably dissolved by inorganic acids and therefore are removed so that the residual amount of the first reducing agent in the tantalum suboxides powders obtained after the removal of impurities is less than 100 ppm. In the first reduction reaction step, the reaction temperature is preferably 400-1000° C., and the reaction time is preferably 3-10 hours. Besides, the oxygen content in the tantalum suboxides powders obtained from the first reduction step is 7-12.5% by weight.

In the second reduction reaction step, the tantalum suboxides powders are reduced by using a second reducing agent, i.e. powders of rare earth metals or hydrides thereof. The amount of the second reducing agent is preferably adjusted to 0.4-0.85 times of the stoichiometric amount of the reducing agent required for removing oxygen content in the tantalum suboxides powders, and the oxides formed from the second reducing agent or the residual second reducing agent are preferably dissolved by inorganic acids and therefore are removed so that the residual amount of the second reducing agent in the tantalum powders having high oxygen content obtained after the removal of impurities is less than 100 ppm. In the second reduction reaction step, the reaction temperature is preferably 400-1000° C., and the reaction time is preferably 3-10 hours. Besides, the oxygen content in the tantalum powders having high oxygen content obtained from the second reduction step is 1.5-4% by weight.

In the third reduction reaction step, the tantalum powders having high oxygen content generated in the second reduction step are reduced by using a third reducing agent, wherein the amount of the third reducing agent is preferably adjusted to 1.0-2.0 times of the stoichiometric amount of the reducing agent required for removing oxygen content in the tantalum powders having high oxygen content, and the oxides formed from the third reducing agent or the residual third reducing agent are preferably dissolved by inorganic acids and therefore are removed so that the residual amount of the third reducing agent in the tantalum powders finally obtained is less than 100 ppm. In the third reduction reaction step, the reaction temperature is preferably 300-900° C., and the reaction time is preferably 2-6 hours.

As an anodic material of capacitors, tantalum powders must satisfy the production requirements of automatic molding, and thereby must have good particle shape and good fluidity, consequently, before the first reduction reaction step is carried out, the powders of tantalum oxide should be agglomerated so that the tantalum powders finally obtained have good physical properties, such as fluidity, compactibility, porosity and so on.

According to the embodiments of the present invention, when the powders of tantalum oxides are agglomerated, dopants containing N, P, S, B, etc. elements are added to suppress the loss of specific surface area of tantalum oxide powders, tantalum suboxides powders or tantalum powders having high oxygen content in the first, second or third reduction step.

In accordance with the specific capacity of the tantalum powders to be prepared, an appropriate amount of dopants containing N, P, S, B etc. elements can be added before the third reduction reaction step is carried out to suppress the loss of specific surface area of tantalum powders having high oxygen content in the third reduction reaction step and thereby obtaining higher specific capacity.

The tantalum powders obtained by said three steps reduction have 20 nm to 8 μm particle size of primary particles and 2 m$^2$/g-10 m$^2$/g BET specific surface area. When the tantalum powders obtained by three steps reduction are prepared into an anode of electrolytic capacitor, said anode has a specific capacity of about 100,000 to about 400,000 CV/g.

In the process according to the invention, the particle size of raw materials has important effect on the properties of products. Too large particle size of raw materials renders the resultant tantalum powders have too large particle size and thereby have smaller specific capacity; while too small particle size of raw materials has less contribution to the specific capacity of products and leads to too high production cost. The particle size of tantalum oxide powders employed is preferably 0.02-8 μm, more preferably 0.03-5 μm.

The inorganic acids used in the process according to the invention are selected from the group consisting of hydrochloric acid, nitric acid, sulfuric acid and a mixture thereof, and preferably hydrochloric acid. The concentration of the inorganic acid aqueous solution is 5-30% by weight, preferably 10-20% by weight, and more preferably 10-15% by weight. Washing the products with acid so that the amount of residual rare earth metals in the tantalum powders finally obtained is 100 ppm.

Drying method used in the process according to the invention is not specially limited, including but being not limited to air drying, drying in oven, vacuum drying. When the tantalum powders are dried in oven, the drying temperature is not specially limited, so long as it does not affect the physical and chemical properties of resultant tantalum powders. The drying temperature is preferably 60-130° C.

In the process according to the invention, when the hydrides of rare earth metals are employed as reducing agents, excess hydrides of rare earth metals are decomposed into rare earth metals and hydrogen at high temperature in the reduction process, and therefore the excess reducing agents in the products will be in the form of rare earth metals.

The particles of the tantalum powders obtained by the process according to the invention are coral, sponge, sphere, plate, angle shapes or any combination thereof.

In the process of the invention, tantalum powders are also prepared by one-step or two-step reduction with rare earth metals or hydrides thereof as reducing agents. Since the reducing agents employed are too much, the tantalum powders prepared have lower capacity than those prepared by three-step reduction. As compared with the process of preparing tantalum powders by reducing potassium fluorotantalate with sodium, the production cost is higher.

DETAILED DESCRIPTION OF PREFERRED EMBODIMENTS

Figure 1:
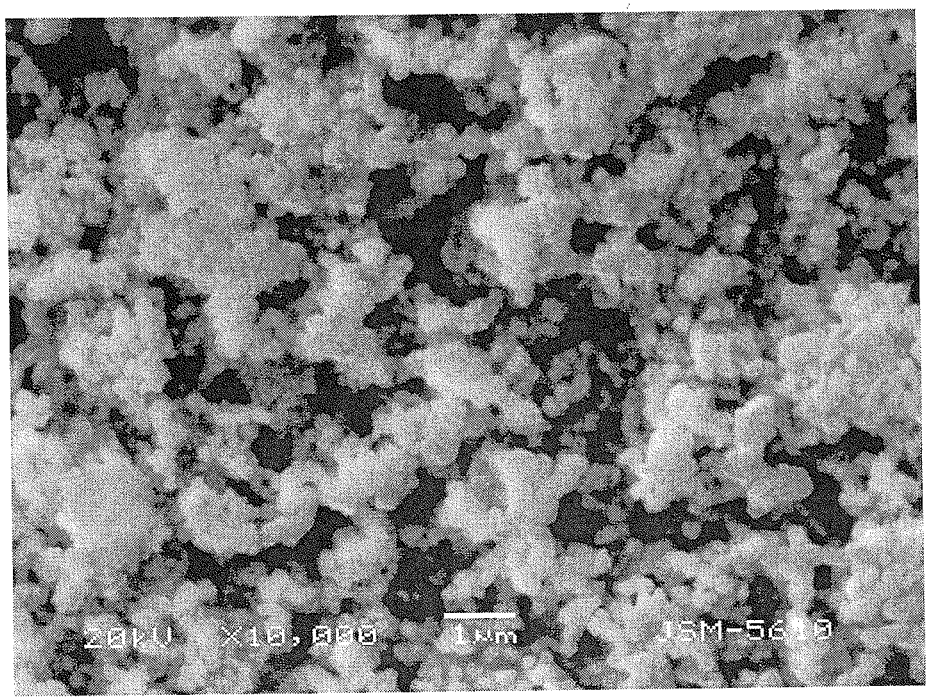
FIG. 1 shows the scanning electron microscope photograph of tantalum powders obtained in Example 1 at a magnification of 10000 times.
Figure 2:
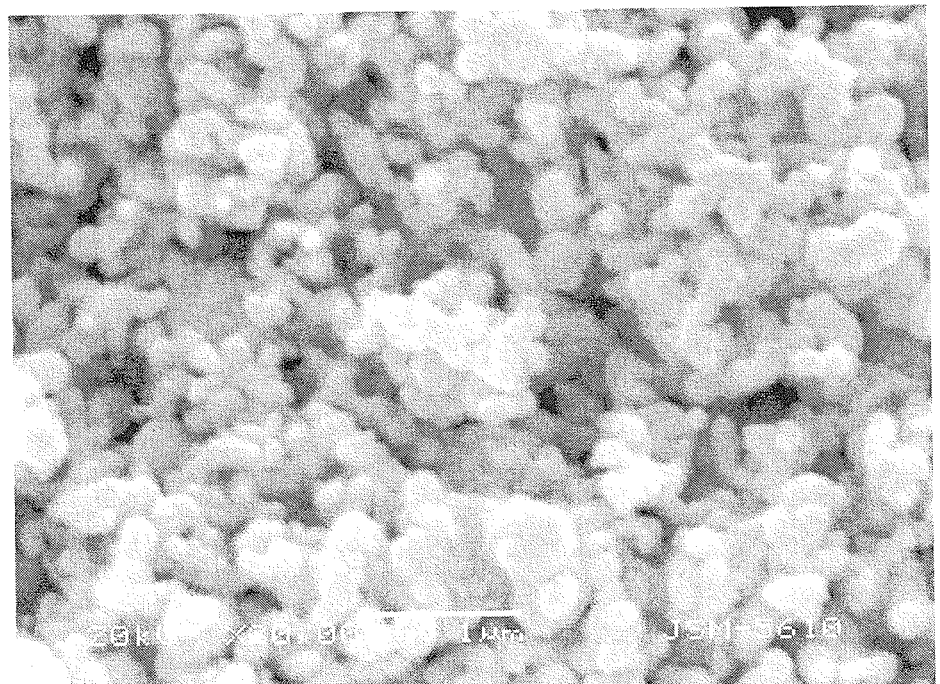
FIG. 2 shows the scanning electron microscope photograph of tantalum powders obtained in Example 3 at a magnification of 20000 times.
Figure 3:
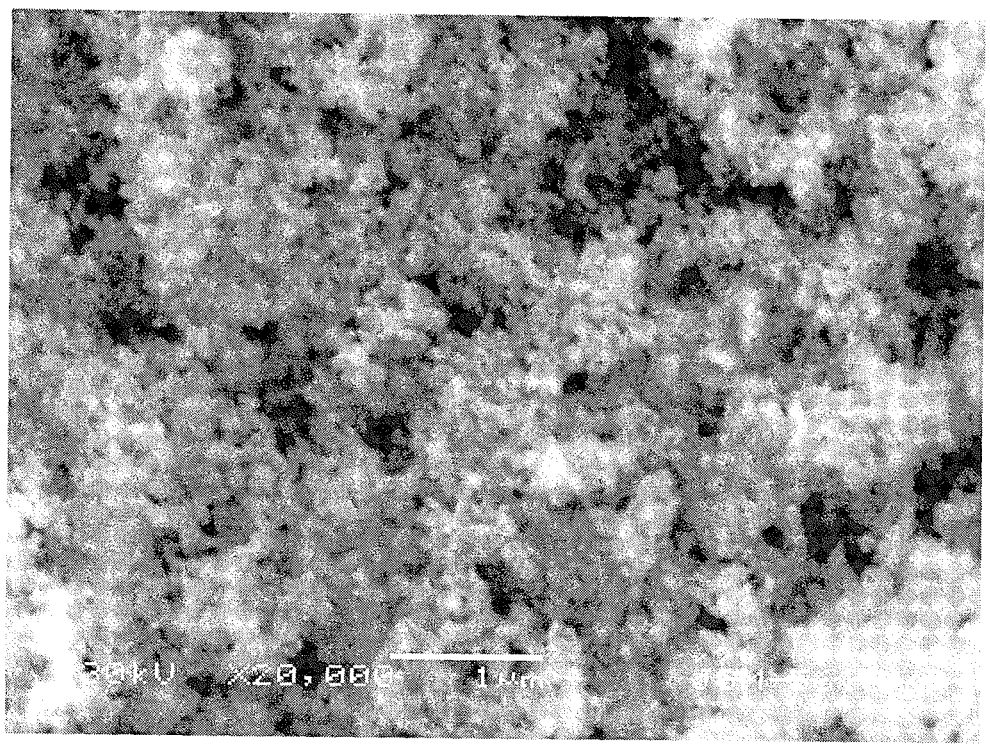
FIG. 3 shows the scanning electron microscope photograph of tantalum powders obtained in Example 5 at a magnification of 20000 times.

In the embodiments of the invention, tantalum oxides are reduced with rare earth metals or hydrides thereof and magnesium-containing alloys in three steps.

As compared with three-step reduction process, in the process of preparing tantalum powders through one step or two steps, the addition of reducing agents is excessive, the heat liberation quantity is larger, and reduction temperature is higher, therefore, the tantalum powders prepared have lower specific capacity.

Hence, in order to obtain tantalum powders with higher specific capacity, three-step reduction process according to the invention is preferably employed.

In the first reduction step, the tantalum suboxides powders are obtained, and the oxygen content thereof should be 7% to 12.5% by weight. Then the oxides of rare earth metals and remaining rare earth metals thereof produced in the first reduction step are removed, and then in the second reduction step, the tantalum suboxides powders produced in the first reduction step are further reduced with rare earth metals or hydrides thereof to obtain the tantalum powders having high oxygen content.

When the oxygen content in the tantalum suboxides powders obtained from the first step is required to be less than 7%, the oxygen in the first step is reduced excessively so that excess reducing agents should be employed, thereby a large amount of heat will generate in the reaction process, and thus the particles become coarse and the tantalum powders with high specific capacity cannot be prepared easily. On the other hand, when the oxygen content is greater than 12.5%, excess reducing agents should be employed in the second reduction step, thereby a large amount of heat will generate in the reaction process, and thus the particles become coarse, even overburnt.

In the second reduction step, the tantalum powders having high oxygen content are obtained, and the oxygen content thereof should be between 1.5% and 4% by weight. Then in the third reduction step, the oxides of rare earth metals and remaining rare earth metals produced in the second reduction step are removed, and the tantalum powders having high oxygen content produced in the second reduction step are further reduced with magnesium or magnesium alloys powders to obtain tantalum powders with super-high specific capacity.

When the oxygen content in the tantalum powders having high oxygen content obtained from the second reduction step is less than 1.5%, the oxygen in the second reduction step is reduced excessively so that excess reducing agents should be employed, thereby a large amount of heat will generate in the reaction process, and thus the particles become coarse and the tantalum powders with high specific capacity cannot be prepared easily. On the other hand, when the oxygen content is greater than 4.0%, excess reducing agents should be employed in the third reduction step, thereby a large amount of heat will generate in the reaction process, and thus the particles become coarse, even overburnt.

Before the first reduction step is carried out, the powders of tantalum oxides should be agglomerated. The object of the agglomeration is to aggregate finely divided powders to form sphere-like secondary particles to decrease −325 mesh fine powders, so that the finally obtained tantalum powders have good physical properties, such as fluidity, compactibility and porosity, while their specific surface area is reduced slightly.

Since the first two steps of the reduction process according to the invention are solid-solid reactions, the physical properties of the powders of tantalum oxide as raw materials finally affect the physical properties of the final tantalum powders. Hence, the agglomeration of tantalum oxides can be conducted.

Besides, in accordance with the physical properties of the tantalum powders having high oxygen content obtained from the second reduction step, the tantalum powders having high oxygen content can also be appropriately agglomerated before the third reduction step is carried out so that the finally obtained tantalum suboxides powders have good physical properties, such as fluidity, compactibility, porosity.

When tantalum oxide powder or tantalum powder having high oxygen content are agglomerated, dopants containing N, P, S, B, etc. elements are added to further suppress the loss of the specific surface area of tantalum powders caused by the growth of the particles of tantalum oxide powders, tantalum suboxides powders or tantalum powders having high oxygen content in the first, second or third reduction reaction steps so that the prepared tantalum powders have very high specific surface area.

In the third reduction reaction step, when magnesium or magnesium alloy powders are used to reduce the tantalum powders having high oxygen content generated in the second reduction step, the amount of the reducing agents is preferably adjusted to 1.0-2.0 times of the stoichiometric amount of the reducing agents required for removing the oxygen content retained in the tantalum powders having high oxygen content, and the reducing agents are preferably dissolved by inorganic acids and thereby being removed, so that the residual amount of the reducing agents in the tantalum powder finally obtained is less than 150 ppm. When the amount of reducing agents is less than 1.0 time of the stoichiometric amount, the reduction reaction is not complete, and the oxygen content in the prepared tantalum powders is too high. When the amount of reducing agents is greater than 2.0 times of the stoichiometric amount, the amount of residual rare earth metals or hydrides thereof is increased, so that the amount of acids used in subsequent acid-washing is increased, and the production cost is increased simultaneously.

When the amount of the third reducing agent is adjusted to 1.0-2.0 times of the stoichiometric amount of the reducing agents required for removing the oxygen content retained in the tantalum powders having high oxygen content, the oxygen content of the prepared tantalum powders is between 5000 and 20000 ppm.

The tantalum oxide employed in the first reduction step is not specially limited, preferably tantalum pentoxide.

The reducing agents employed in the first, second reduction steps are preferably yttrium, lanthanum, cerium, praseodymium, neodymium or at least one of hydrides thereof or mixtures and alloys thereof; the reducing agents employed in the third reduction step is preferably a powder of magnesium or an alloy formed from magnesium with calcium, zinc, yttrium, lanthanum, cerium, praseodymium, and/or neodymium. The alloy powder has advantages of lower melting point or reducing reaction rate of a metal contained therein, easy oxygen content reduction, and easy removal.

In the first, second and third reduction steps, the vacuum atmosphere employed and the hydrogen gas and/or inert gas atmosphere employed are not specially limited, however, from the viewpoint of safe production, the pressure of the hydrogen gas and/or inert gas atmosphere should not be above 0.15 MPa.

In the first, second or third reduction steps, the reducing agents are mixed homogeneously with tantalum oxide or tantalum suboxides or tantalum of high oxygen content powders, loaded into a Mo crucible, and allowed to react at certain temperature and time in hydrogen gas and/or inert gases or vacuum atmosphere. Since the addition amount of reducing agents in the first, second and third step reduction reactions is controlled to some extent, the finally obtained tantalum powders have homogeneous particle size, low content of impurities, large specific surface area and high specific capacity.

The reaction temperature of the first and the second reduction steps is preferably 400-1000° C. When the reaction temperature is above 1000° C., the melting point of the reducing agents is achieved or exceeded, then the reaction is changed from solid-solid reaction to liquid-solid reaction, therefore the reaction rate is so rapid that the oxides of tantalum and the tantalum powders at low-oxidation state are sintered, and thereby the powders become coarse. Consequently, the reduction temperature is preferably not above 1000° C. On the other hand, when the temperature is below 400° C., the reaction is not complete.

The reaction times of the first and the second reduction steps are preferably 3-10 hours. In this time duration, the reduction reactions are substantially complete. If the reaction time exceeds 10 hours, too long holding time will cause the particles of reaction products coarse and the production cost increased. If the reaction time is less than 3 hours, too short reaction time renders the reaction incomplete.

The reaction temperature in the third reduction step is preferably 300-900° C. As stated above, the tantalum powders prepared by three-step reduction has super-high specific capacity. When the reaction temperature exceeds 900° C., the reaction rate is so quick that the tantalum powders are sintered, and the powders become coarse. Hence, the reduction temperature is preferably not above 900° C. On the other hand, when the temperature is below 300° C., the reaction is not complete.

The reaction time of the third reduction step is preferably 2-6 hours. In this time duration, the reduction reaction is substantially complete. When the reaction time exceeds 6 hours, too long holding time will cause the particles of reaction products coarse and the production cost increased. If the reaction time is less than 2 hours, too short reaction time renders the reaction incomplete.

In the third step reduction process, the effect of using alloy powders is to reduce the temperature to decrease oxygen content in tantalum powders or reduce the reaction rate of a single reductive metal through lower melting point of the alloy, so as to achieve good oxygen content reduction effect of tantalum powders, and simultaneously to reduce the loss of the specific surface area of tantalum powders as much as possible.

In preferred embodiments, the oxides of rare earth metals and remaining rare earths or hydrides thereof produced in the first and second reduction steps are removed by acid-washing with inorganic acids and then washing with water.

The average size of particles is measured by Fsss method. The oxygen content is determined by using an infrared absorption oxygen analyzer. The specific surface area is measured by BET method. The specific bulk density (SBD) is measured by SCOTT method.

The measurement of electric properties: 150 mg tantalum powders are compressed into a compact with a density of 4.5-5.5 g/cm$^3$ and a diameter of 3.0 mm, sintered in vacuum furnace at 1000-1500° C. for 20-30 minutes, and the sintered compact is applied with a voltage of 16-200 V at 60-90° C. in 0.1% phosphoric acid solution to form an anode, and then the capacity and leakage current of the anodic compact are measured.

EXAMPLES

In order to further explain the invention, the preferred embodiments of the invention are described by way of examples with reference to the drawings, from which the object, characteristics and advantages of the invention can be seen obviously. However, these descriptions are only used for further describing the characteristics and advantages of the invention, but not limiting the invention.

Example 1

300 g tantalum pentoxide powders passing through 60 mesh sieve (Fsss average particle size: 1.04 μm, SBD: 0.89 g/cm$^3$) and 210 g neodymium hydride powders passing through 50 mesh sieve (corresponding to 0.43 times of the stoichiometric amount of the reducing agents required for removing the oxygen content in tantalum oxide powders) were mixed homogeneously, put in a molybdenum crucible. The molybdenum crucible filled with the materials was placed in a closed reaction vessel, vacuumed and filled with argon, heated in argon atmosphere to 800° C., held for 4 hours. Upon the completion of cooling and passivation, the powders in the molybdenum crucible were taken out and immersed in 10% by weight of hydrochloric acid to remove neodymium oxide and remaining metal neodymium by dissolution, and then the powders were filtration washed with deionized water and dried. Tantalum suboxides powder was obtained, and its oxygen content was measured to be 12.1% by weight.

Neodymium hydride powders passing through 50 mesh sieve were added into the tantalum suboxides powders obtained, and the amount of the neodymium hydride powders correspond to 0.75 times of the stoichiometric amount of the reducing agents required for removing the oxygen content in tantalum suboxides powders. Mixing homogeneously and put the mixture in a molybdenum crucible. The molybdenum crucible filled with the materials was placed in a closed reaction vessel, vacuumed and filled with argon, heated in argon atmosphere to 840° C., held for 6 hours. Upon the completion of cooling and passivation, the tantalum powders in the molybdenum crucible was taken out and immersed in 10% by weight of hydrochloric acid to remove neodymium oxide and remaining metal neodymium by dissolution, and then the powders were filtration washed with deionized water and dried to obtain tantalum powders having high oxygen content, with oxygen content of 3.15% by weight.

Magnesium powders passing through 10 mesh sieve was added into the resultant tantalum powders having high oxygen content, and the amount of the magnesium powders correspond to 1.8 times of the stoichiometric amount of the reducing agents required for removing the oxygen content in tantalum powders having high oxygen content. Mixing homogeneously and put the mixture in a molybdenum crucible. The molybdenum crucible filled with the materials was placed in a closed reaction vessel, vacuumed and filled with argon, held at 500-800° C. for 3 hours in argon atmosphere. Upon the completion of cooling and passivation, the tantalum powders in the molybdenum crucible was taken out and immersed in 10% by weight of hydrochloric acid to remove magnesium oxide and remaining metal magnesium by dissolution, and then the powders were filtration washed with deionized water and dried to obtain relative pure tantalum powders. Their oxygen content, Fsss average particle size, SBD, and BET specific surface area were measured. The results were shown in table 1. The electric properties were measured through following method: the tantalum powders obtained above were compressed into a compact with a density of 5.0 g/cm$^3$ and a diameter of 3.0 mm, sintered in vacuum furnace at 1300° C. for 20 minutes to obtain tantalum sintered compact, and the sintered compact was applied with a voltage of 20 V in 0.1% phosphoric acid solution at 85° C. to form a tantalum anode. The specific electric capacity and leakage current of the anode were shown in table 1.

Example 2

300 g tantalum pentoxide powders passing through 60 mesh sieve (Fsss average particle size: 1.04 μm, SBD: 0.89 g/cm$^3$) and 120 g yttrium powders passing through 50 mesh sieve (corresponding to 0.4 times of the stoichiometric amount of the reducing agents required for removing the oxygen content in tantalum oxide powders) were mixed homogeneously, put in a molybdenum crucible. The molybdenum crucible filled with the materials was placed in a closed reaction vessel, vacuumed and filled with argon, heated in argon atmosphere to 800° C. Then hydrogen was introduced into the reaction vessel. The molybdenum crucible was held at 800-920° C. for 7 hours. Upon the completion of cooling and passivation, the powders in the molybdenum crucible were taken out and immersed in 10% by weight of hydrochloric acid to remove yttrium oxide and remaining metal yttrium by dissolution, and then the powders were filtration washed with deionized water and dried. Tantalum suboxides powders were obtained, and its oxygen content was measured to be 9.4% by weight.

Yttrium powders passing through 50 mesh sieve was added into the tantalum suboxides powders obtained, and the amount of the yttrium powders correspond to 0.8 times of the stoichiometric amount of the reducing agents required for removing the oxygen content in tantalum suboxides powders. Mixing homogeneously and put the mixture in a molybdenum crucible. The molybdenum crucible filled with the materials was placed in a closed reaction vessel, vacuumed and filled with argon, heated in argon atmosphere to 880° C. Then hydrogen was introduced into the reaction vessel. The molybdenum crucible was held for 5 hours. Upon the completion of cooling and passivation, the tantalum powders in the molybdenum crucible was taken out and immersed in 10% by weight of hydrochloric acid to remove yttrium oxide and remaining metal yttrium by dissolution, and then the powders were filtration washed with deionized water and dried to obtain tantalum powders having high oxygen content, with oxygen content of 1.98% by weight.

Yttrium-magnesium alloy (Mg$_2$Y) powders passing through 20 mesh sieve was added into the obtained tantalum powders having high oxygen content, and the amount of the yttrium-magnesium alloy (Mg$_2$Y) powders correspond to 1.4 times of the stoichiometric amount of the reducing agents required for removing the oxygen content in tantalum powders having high oxygen content. Mixing homogeneously and put the mixture in a molybdenum crucible. The molybdenum crucible filled with the materials was placed in a closed reaction vessel, vacuumed and filled with argon, heated in argon atmosphere to 600° C., introduced with hydrogen, held at 600-820° C. for 5 hours. Upon the completion of cooling and passivation, the tantalum powders in the molybdenum crucible was taken out and immersed in 10% by weight of hydrochloric acid to remove magnesium oxide, yttrium oxide and remaining metal magnesium and yttrium by dissolution, and then the powders were filtration washed with deionized water and dried to obtain relative pure tantalum powders. Their oxygen content, Fsss average particle size, SBD, and BET specific surface area were measured. The results were shown in table 1. The electric properties were measured through following method: the tantalum powders obtained above were compressed into a compact with a density of 5.0 g/cm$^3$ and a diameter of 3.0 mm, sintered in vacuum furnace at 1300° C. for 20 minutes to obtain tantalum sintered compact, and the sintered compact was applied with a voltage of 20 V in 0.1% phosphoric acid solution at 85° C. to form a tantalum anode. The specific electric capacity and leakage current of the anode were shown in table 1.

Example 3

300 g tantalum pentoxide powders passing through 80 mesh sieve (Fsss average particle size: 0.75 μm, SBD: 0.51 g/cm$^3$) and 250 g lanthanum hydride powders passing through 60 mesh sieve (corresponding to 0.54 times of the stoichiometric amount of the reducing agents required for removing the oxygen content in tantalum oxide powders) were mixed homogeneously, put in a molybdenum crucible. The molybdenum crucible filled with the materials was placed in a closed reaction vessel, vacuumed and filled with argon, heated in argon atmosphere to 800° C., and held at 800° C. for 8 hours. Upon the completion of cooling and passivation, the powders in the molybdenum crucible was taken out and immersed in 10% by weight of hydrochloric acid to remove lanthanum oxide and remaining metal lanthanum by dissolution, and then the powders were filtration washed with deionized water and dried. Tantalum powder at low-oxidization state was obtained, and its oxygen content was measured to be 8.7% by weight.

Lanthanum hydride powders passing through 60 mesh sieve was added into the tantalum suboxides powders obtained, and the amount of the lanthanum hydride powders corresponded to 0.6 times of the stoichiometric amount of the reducing agents required for removing the oxygen content in tantalum suboxides powders. Mixing homogeneously and put the mixture in a molybdenum crucible. The molybdenum crucible filled with the materials was placed in a closed reaction vessel, vacuumed and filled with argon, heated in argon atmosphere, and held at 600-800° C. for 6 hours. Upon the completion of cooling and passivation, the tantalum powders in the molybdenum crucible was taken out and immersed in 10% by weight of hydrochloric acid to remove lanthanum oxide and remaining metal lanthanum by dissolution, and then the powders were filtration washed with deionized water and dried to obtain tantalum powders having high oxygen content, with oxygen content of 2.15% by weight.

Lanthanum-magnesium alloy (MgLa) powders passing through 20 mesh sieve were added into the obtained tantalum powders having high oxygen content, and the amount of the lanthanum-magnesium alloy (MgLa) powders correspond to 1.75 times of the stoichiometric amount of the reducing agents required for removing the oxygen content in tantalum powders having high oxygen content. Mixing homogeneously and put the mixture in a molybdenum crucible. The molybdenum crucible filled with the materials was placed in a closed reaction vessel, vacuumed and filled with argon, heated in argon atmosphere to 600° C., introduced with hydrogen, held at 600-820° C. for 4 hours. Upon the completion of cooling and passivation, the tantalum powders in the molybdenum crucible was taken out and immersed in 10% by weight of hydrochloric acid to remove magnesium oxide, lanthanum oxide and remaining metal magnesium and lanthanum by dissolution, and then the powders were filtration washed with deionized water and dried to obtain relative pure tantalum powders. Their oxygen content, Fsss average particle size, SBD, and BET specific surface area were measured. The results were shown in table 1. The electric properties were measured through following method: the tantalum powders obtained above were compressed into a compact with a density of 5.0 g/cm$^3$ and a diameter of 3.0 mm, sintered in vacuum furnace at 1200° C. for 20 minutes to obtain tantalum sintered compact, and the sintered compact was applied with a voltage of 20 V in 0.1% phosphoric acid solution at 85° C. to form a tantalum anode. The specific electric capacity and leakage current of the anode were shown in table 1.

Example 4

300 g tantalum pentoxide powders passing through 80 mesh sieve (Fsss average particle size: 0.5 μm, SBD: 0.32 g/cm$^3$) and 210 g lanthanum powders passing through 60 mesh sieve (corresponding to 0.45 times of the stoichiometric amount of the reducing agents required for removing the oxygen content in tantalum oxide powders) were mixed homogeneously, put in a molybdenum crucible. The molybdenum crucible filled with the materials was placed in a closed reaction vessel, vacuumed and filled with argon, heated in argon atmosphere to 600° C., and hydrogen was introduced into the reaction vessel, held at 600-800° C. for 5 hours. Upon the completion of cooling and passivation, the powders in the molybdenum crucible was taken out and immersed in 10% by weight of hydrochloric acid to remove lanthanum oxide and remaining metal lanthanum by dissolution, and then the powders were filtration washed with deionized water and dried. Tantalum powder at low-oxidization state was obtained, and its oxygen content was measured to be 10.8% by weight.

Lanthanum hydride powders passing through 60 mesh sieve was added into the tantalum suboxides powders obtained, and the amount of the lanthanum hydride powders corresponded to 0.7 times of the stoichiometric amount of the reducing agents required for removing the oxygen content in tantalum suboxides powders. Mixing homogeneously and put the mixture in a molybdenum crucible. The molybdenum crucible filled with the materials was placed in a closed reaction vessel, vacuumed and filled with argon, heated in argon atmosphere to 600° C., then hydrogen was introduced into the reaction vessel, held at 600-800° C. for 7 hours. Upon the completion of cooling and passivation, the tantalum powders in the molybdenum crucible was taken out and immersed in 10% by weight of hydrochloric acid to remove lanthanum oxide and remaining metal lanthanum by dissolution, and then the powders were filtration washed with deionized water and dried to obtain tantalum powders having high oxygen content, with oxygen content of 2.43% by weight.

Magnesium-zinc alloy (MgZn) powders passing through 20 mesh sieve was added into the obtained tantalum powders having high oxygen content, and the amount of the magnesium-zinc alloy (MgZn) powders corresponded to 1.3 times of the stoichiometric amount of the reducing agents required for removing the oxygen content in tantalum powders having high oxygen content. Mixing homogeneously and put the mixture in a molybdenum crucible. The molybdenum crucible filled with the materials was placed in a closed reaction vessel, vacuumed and filled with argon, heated in argon atmosphere to 520° C., held for 3 hours, and then vacuumed and heated to 700° C. and held for 3 hours (by vacuuming method, majority of metal zinc was extracted, the remaining zinc was removed by acid-washing). Upon the completion of holding, argon was introduced into the reaction vessel to positive pressure, and then cooled. Upon the completion of cooling and passivation, the tantalum powders in the molybdenum crucible was taken out and immersed in 10% by weight of hydrochloric acid to remove the oxides of reducing agents and remaining reducing agents, and then the powders were filtration washed with deionized water and dried to obtain relative pure tantalum powders. Their oxygen content, Fsss average particle size, SBD, and BET specific surface area were measured. The results were shown in table 1. The electric properties were measured through following method: the tantalum powders obtained above were compressed into a compact with a density of 5.0 g/cm$^3$ and a diameter of 3.0 mm, sintered in vacuum furnace at 1150° C. for 20 minutes to obtain tantalum sintered compact, and the sintered compact was applied with a voltage of 20 V in 0.1% phosphoric acid solution at 85° C. to form a tantalum anode. The specific electric capacity and leakage current of the anode were shown in table 1.

Example 5

300 g tantalum pentoxide powders passing through 80 mesh sieve (Fsss average particle size: 0.2 μm, SBD: 0.20 g/cm$^3$) and 220 g cerium powders passing through 60 mesh sieve (corresponding to 0.42 times of the stoichiometric amount of the reducing agents required for removing the oxygen content in tantalum oxide powders) were mixed homogeneously, put in a molybdenum crucible. The molybdenum crucible filled with the materials was placed in a closed reaction vessel, vacuumed and filled with argon, heated in argon atmosphere to 600° C., and hydrogen was introduced into the reaction vessel, held at 600-800° C. for 4 hours. Upon the completion of cooling and passivation, the powders in the molybdenum crucible was taken out and immersed in 10% by weight of hydrochloric acid to remove cerium oxide and remaining metal cerium by dissolution, and then the powders were filtration washed with deionized water and dried. Tantalum powder at low-oxidization state was obtained, and its oxygen content was measured to be 11.28% by weight.

Cerium powders passing through 60 mesh sieve was added into the tantalum suboxides powders obtained, and the amount of the cerium powders corresponded to 0.68 times of the stoichiometric amount of the reducing agents required for removing the oxygen content in tantalum suboxides powders. Mixing homogeneously and put the mixture in a molybdenum crucible. The molybdenum crucible filled with the materials was placed in a closed reaction vessel, vacuumed and filled with argon, heated in argon atmosphere to 600° C., then hydrogen was introduced into the reaction vessel, held at 600-800° C. for 9 hours. Upon the completion of cooling and passivation, the tantalum powders in the molybdenum crucible was taken out and immersed in 10% by weight of hydrochloric acid to remove cerium oxide and remaining metal cerium by dissolution, and then the powders were filtration washed with deionized water and dried to obtain tantalum powders having high oxygen content, with oxygen content of 3.08% by weight.

The obtained tantalum powders having high oxygen content was agglomerated, then calcium-magnesium alloy ($Mg_2Ca$) powders passing through 20 mesh sieve were added, and the amount of the calcium-magnesium alloy powders corresponded to 1.48 times of the stoichiometric amount of the reducing agents required for removing the oxygen content in tantalum powders having high oxygen content, mixed homogeneously, and put in a molybdenum crucible. The molybdenum crucible filled with the materials was placed in a closed reaction vessel, vacuumed and filled with argon, held in argon atmosphere at 500-800° C. for 4 hours. Upon the completion of cooling and passivation, the tantalum powders in the molybdenum crucible was taken out and immersed in 10% by weight of hydrochloric acid to remove magnesium oxide, calcium oxide, and remaining metal magnesium and calcium, and then the powders were filtration washed with deionized water and dried to obtain relative pure tantalum powders. Their oxygen content, Fsss average particle size, SBD, and BET specific surface area were measured. The results were shown in table 1. The electric properties were measured through following method: the tantalum powders obtained above were compressed into a compact with a density of 5.0 g/cm$^3$ and a diameter of 3.0 mm, sintered in vacuum furnace at 1150° C. for 20 minutes to obtain tantalum sintered compact, and the sintered compact was applied with a voltage of 20 V in 0.1% phosphoric acid solution at 85° C. to form a tantalum anode. The specific electric capacity and leakage current of the anode were shown in table 1.

Example 6

300 g tantalum pentoxide powders passing through 100 mesh sieve (Fsss average particle size: 0.1 μm, SBD: 0.19 g/cm$^3$) and 200 g lanthanum powders passing through 80 mesh sieve (corresponding to 0.36 times of the stoichiometric amount of the reducing agents required for removing the oxygen content in tantalum oxide powders) were mixed homogeneously, put in a molybdenum crucible. The molybdenum crucible filled with the materials was placed in a closed reaction vessel, vacuumed and filled with argon, heated in argon atmosphere to 600° C., and hydrogen was introduced into the reaction vessel, held at 600-800° C. for 8 hours. Upon the completion of cooling and passivation, the powders in the molybdenum crucible was taken out and immersed in 10% by weight of hydrochloric acid to remove lanthanum and remaining metal lanthanum by dissolution, and then the powders were filtration washed with deionized water and dried. Tantalum powder at low-oxidization state was obtained, and its oxygen content was measured to be 10.53% by weight.

Yttrium powders passing through 80 mesh sieve were added into the tantalum suboxides powders obtained, and the amount of the yttrium powders corresponded to 0.82 times of the stoichiometric amount of the reducing agents required for removing the oxygen content in tantalum suboxides powders. Mixing homogeneously and put the mixture in a molybdenum crucible. The molybdenum crucible filled with the materials was placed in a closed reaction vessel, vacuumed and filled with argon, heated in argon atmosphere to 600° C., then hydrogen was introduced into the reaction vessel, held at 600-800° C. for 9 hours. Upon the completion of cooling and passivation, the tantalum powders in the molybdenum crucible was taken out and immersed in 10% by weight of hydrochloric acid to remove yttrium oxide and remaining metal yttrium by dissolution, and then the powders were filtration washed with deionized water and dried to obtain tantalum powders having high oxygen content, with oxygen content of 3.67% by weight.

Yttrium-magnesium alloy ($Mg_2Y$) powders passing through 60 mesh sieve were added into the obtained tantalum powders having high oxygen content, and the amount of the yttrium-magnesium alloy powders corresponding to 1.2 times of the stoichiometric amount of the reducing agents required for removing the oxygen content in tantalum powders having high oxygen content and 0.2 times of the weight thereof. Mixing homogeneously and put the mixture in a molybdenum crucible. The molybdenum crucible filled with the materials was placed in a closed reaction vessel, vacuumed and filled with argon, heated in argon atmosphere to 600° C. And then hydrogen was introduced into the reaction vessel, held at 600-780° C. for 6 hours. Upon the completion of cooling and passivation, the tantalum powders in the molybdenum crucible was taken out and immersed in 10% by weight of hydrochloric acid to remove magnesium oxide, yttrium oxide, and remaining metal magnesium and yttrium, and then the powders were filtration washed with deionized water and dried to obtain relative pure tantalum powders. Their oxygen content, Fsss average particle size, SBD, and BET specific surface area were measured. The results were shown in table 1. The electric properties were measured through following method: the tantalum powders obtained above were compressed into a compact with a density of 5.0 g/cm$^3$ and a diameter of 3.0 mm, sintered in vacuum furnace at 1100° C. for 10 minutes to obtain tantalum sintered compact, and the sintered compact was applied with a voltage of 16 V in 0.1% phosphoric acid solution at 85° C. to form a tantalum anode. The specific electric capacity and leakage current of the anode were shown in table 1.

Example 7

According to the method in Example 3, except that the addition amount of lanthanum hydride powders in the first step reduction was changed as 270 g (corresponding to 0.55 times of the stoichiometric amount of the reducing agents required for removing the oxygen content in tantalum oxide powders), rest conditions were the same. The oxygen content of the obtained tantalum powder at low-oxidization state was measured as 8.48%.

Lanthanum hydride powders passing through 60 mesh sieve were added into the tantalum suboxides powders obtained, and the amount of the lanthanum hydride powders corresponded to 0.50 times of the stoichiometric amount of the reducing agents required for removing the oxygen content in tantalum suboxides powders. Mixing homogeneously and put the mixture in a molybdenum crucible. The molybdenum crucible filled with the materials was placed in a closed reaction vessel, vacuumed and filled with argon, heated in argon atmosphere, held at 600-800° C. for 6 hours. Upon the completion of cooling and passivation, the tantalum powders in the molybdenum crucible was taken out and immersed in 10% by weight of hydrochloric acid to remove lanthanum oxide and remaining metal lanthanum by dissolution, and then the powders were filtration washed with deionized water and dried. The oxygen content of the tantalum powders having high oxygen content obtained was measured as 2.34%.

lanthanum-magnesium alloy (MgLa) powders passing through 20 mesh sieve were added into the obtained tantalum powders having high oxygen content, and the amount of the lanthanum-magnesium alloy (MgLa) powders corresponded to 1.15 times of the stoichiometric amount of the reducing agents required for removing the oxygen content in tantalum powders having high oxygen content. Mixing homogeneously and put the mixture in a molybdenum crucible. The molybdenum crucible filled with the materials was placed in a closed reaction vessel, vacuumed and filled with argon, heated in argon atmosphere to 600° C. And then hydrogen was introduced into the reaction vessel, held at 600-820° C. for 5 hours. Upon the completion of cooling and passivation, the tantalum powders in the molybdenum crucible was taken out and immersed in 10% by weight of hydrochloric acid to remove magnesium oxide, lanthanum oxide, and remaining metal magnesium and lanthanum, and then the powders were filtration washed with deionized water and dried to obtain relative pure tantalum powders. Their oxygen content, Fsss average particle size, SBD, and BET specific surface area were measured. The results were shown in table 1. The electric properties were measured through following method: the tantalum powders obtained above were compressed into a compact with a density of 5.0 g/cm$^3$ and a diameter of 3.0 mm, sintered in vacuum furnace at 1200° C. for 20 minutes to obtain tantalum sintered compact, and the sintered compact was applied with a voltage of 20 V in 0.1% phosphoric acid solution at 85° C. to form a tantalum anode. The specific electric capacity and leakage current of the anode were shown in table 1.

Example 8

According to the method in Example 5, the first and the second steps reduction conditions were completely identical. The oxygen content of the tantalum powders having high oxygen content obtained from the second step was measured as 3.08%.

yttrium-magnesium alloy (Mg$_2$Y) powders passing through 20 mesh sieve was added into the obtained tantalum powders having high oxygen content, and the amount of the yttrium-magnesium alloy (Mg$_2$Y) powders corresponded to 1.35 times of the stoichiometric amount of the reducing agents required for removing the oxygen content in tantalum powders having high oxygen content. Mixing homogeneously and put the mixture in a molybdenum crucible. The molybdenum crucible filled with the materials was placed in a closed reaction vessel, vacuumed and filled with argon, heated in argon atmosphere to 600° C. And then hydrogen was introduced into the reaction vessel, held at 600-800° C. for 4 hours. Upon the completion of cooling and passivation, the tantalum powders in the molybdenum crucible was taken out and immersed in 10% by weight of hydrochloric acid to remove magnesium oxide, yttrium oxide, and remaining metal magnesium and yttrium, and then the powders were filtration washed with deionized water and dried to obtain relative pure tantalum powders. Their oxygen content, Fsss average particle size, SBD, and BET specific surface area were measured. The results were shown in table 1. The electric properties were measured by: the tantalum powders obtained above were compressed into a compact with a density of 5.0 g/cm$^3$ and a diameter of 3.0 mm, sintered in vacuum furnace at 1150° C. for 20 minutes to obtain tantalum sintered compact, and the sintered compact was applied with a voltage of 20 V in 0.1% phosphoric acid solution at 85° C. to form a tantalum anode. The specific electric capacity and leakage current of the anode were shown in table 1.

Comparative Example 1

200 g tantalum pentoxide powders passing through 50 mesh sieve (Fsss average particle size: 1.6 μm, SBD: 0.95 g/cm$^3$) and 240 g yttrium powders passing through 50 mesh sieve (corresponding to 1.2 times of the stoichiometric amount of the reducing agents required for removing the oxygen content in tantalum oxide powders) were mixed homogeneously, and put in a molybdenum crucible. The molybdenum crucible filled with the materials was placed in a closed reaction vessel, vacuumed and filled with argon, heated in argon atmosphere to 880° C., and hydrogen was introduced into the reaction vessel, held for 8 hours. Upon the completion of cooling and passivation, the powders in the molybdenum crucible were taken out and immersed in 10% by weight of hydrochloric acid to remove yttrium oxide and remaining metal yttrium by dissolution, and then the powders were filtration washed with deionized water and dried to obtain relative pure tantalum powders. The oxygen content, Fsss average particle size, SBD, and BET specific surface area of the tantalum powders were measured, and the results were as shown in table 1. The electric properties were measured by following method: the tantalum powders obtained above were compressed into a compact with a density of 5.0 g/cm$^3$ and a diameter of 3.0 mm, sintered in vacuum furnace at 1500° C. for 30 minutes to obtain tantalum sintered compact, and the sintered compact was applied with a voltage of 30 V in 0.1% phosphoric acid solution at 85° C. to form a tantalum anode. The specific electric capacity and leakage current of the anode were shown in table 1.

Comparative Example 2

300 g tantalum pentoxide powders passing through 60 mesh sieve (Fsss average particle size: 1.4 μm, SBD: 0.89 g/cm$^3$) and 340 g neodymium hydride powders passing through 50 mesh sieve (corresponding to 0.7 times of the stoichiometric amount of the reducing agents required for removing the oxygen content in tantalum oxide powders) were mixed homogeneously, put in a molybdenum crucible. The molybdenum crucible filled with the materials was placed in a closed reaction vessel, vacuumed and filled with argon, heated in argon atmosphere to 900° C., held for 8 hours. Upon the completion of cooling and passivation, the tantalum suboxides powders in the molybdenum crucible were taken out and immersed in 10% by weight of hydrochloric acid to remove neodymium oxide and remaining metal neodymium by dissolution, and then the powders were filtration washed with deionized water and dried to obtain tantalum suboxides powders. Their oxygen content was measured as 6.4% by weight.

Neodymium hydride powders passing through 50 mesh sieve was added into the tantalum suboxides powders obtained, and the amount of the neodymium hydride powders corresponded to 1.2 times of the stoichiometric amount of the reducing agents required for removing the oxygen content in the tantalum suboxides powders, mixed homogeneously, and put in a molybdenum crucible. The molybdenum crucible filled with the materials was placed in a closed reaction vessel, vacuumed and filled with argon, heated in argon atmosphere to 880° C., held for 6 hours, Upon the completion of cooling and passivation, the tantalum powders in the molybdenum crucible were taken out and immersed in 10% by weight of hydrochloric acid to remove neodymium oxide and remaining metal neodymium, and then the powders were filtration washed with deionized water and dried to obtain relative pure tantalum powders. Their oxygen content, Fsss average particle size, SBD, and BET specific surface area were measured. The results were shown in table 1. The electric properties were measured by: the tantalum powders obtained above were compressed into a compact with a density of 5.0 g/cm³ and a diameter of 3.0 mm, sintered in vacuum furnace at 1300° C. for 20 minutes to obtain tantalum sintered compact, and the sintered compact was applied with a voltage of 20 V in 0.1% phosphoric acid solution at 85° C. to form a tantalum anode. The specific electric capacity and leakage current of the anode were shown in table 1.

TABLE 1

Physical properties of tantalum powders obtained in examples

| No. | Oxygen wt % | Fsss μm | SBD g/cm³ | BET m²/g | K value nA/μFV | Specific capacity μFV/g |
|---|---|---|---|---|---|---|
| Example 1 | 0.578 | 1.58 | 1.52 | 2.08 | 0.31 | 104782 |
| Example 2 | 0.498 | 1.73 | 1.64 | 2.21 | 0.28 | 109532 |
| Example 3 | 0.517 | 1.32 | 1.59 | 2.64 | 0.29 | 158725 |
| Example 4 | 0.608 | 1.47 | 1.50 | 3.03 | 0.33 | 184273 |
| Example 5 | 1.454 | 1.22 | 1.48 | 4.95 | 1.21 | 228720 |
| Example 6 | 1.954 | 1.22 | 1.48 | 8.53 | 1.21 | 290243 |
| Example 7 | 0.798 | 1.27 | 1.38 | 2.93 | 0.43 | 164273 |
| Example 8 | 1.475 | 1.38 | 1.49 | 7.12 | 1.34 | 257850 |
| Comp. Example 1 | 0.395 | 6.1 | 1.72 | 0.52 | 1.31 | 34782 |
| Comp. Example 2 | 0.547 | 4.9 | 1.62 | 1.35 | 0.70 | 71870 |

What is claimed is:

1. A process for preparing tantalum powder with super-high specific capacity for capacitors by reducing tantalum oxide powder through three steps of reductions, which process consists of the steps of:

(1) a first reduction step: mixing tantalum oxide powder and a first reducing agent powder homogenously, and then carrying out a reduction reaction in hydrogen and/or inert gas or vacuum atmosphere to obtain a tantalum suboxides powder; wherein said first reducing agent is selected from the group consisting of rare earth metals, hydrides of rare earth metals and mixtures thereof; and wherein the amount of the reducing agent in the first reduction step is 0.3-0.65 times the stoichiometric amount of reducing agent required for removing oxygen content in the tantalum oxide powder; the reaction temperature in the first reduction step is 400-1000° C., and the reaction time is 3-10 hours;

(2) a second reduction step: mixing the tantalum suboxides powder obtained from step (1), in which impurities have been removed, with a second reducing agent powder homogenously, and carrying out a reduction reaction in hydrogen and/or inert gas or vacuum atmosphere to obtain a tantalum powder having a high oxygen content; wherein the second reducing agent is selected from the group consisting of rare earth metals, hydrides of rare earth metals and mixtures thereof; and wherein the amount of the reducing agent in the second reduction step is 0.4-0.85 times the stoichiometric amount of reducing agent required for removing oxygen content in tantalum suboxides; the reaction temperature in the second reduction step is 400-1000° C., and the reaction time is 3-10 hours;

and (3) a third reduction step: mixing the tantalum powder having high oxygen content obtained from step (2), in which impurities have been removed, with a third reducing agent powder homogenously, and then carrying out a reduction reaction in hydrogen and/or inert gas or vacuum atmosphere to obtain a tantalum metal powder suitable for capacitors; wherein the third reducing agent is magnesium or magnesium alloy; and wherein the amount of the reducing agent in the third reduction step is 1.0-2.0 times the stoichiometric amount of reducing agent required for removing oxygen content in tantalum powder having high oxygen content; the reaction temperature in the third reduction step is 300-900° C., and the reaction time is 2-6 hours;

wherein after each reduction step, the oxidation product of the reducing agent and the residual reducing agent are removed from the reaction product; and wherein the first and second reduction steps are solid-solid reactions.

2. The process according to claim 1, wherein said tantalum oxide is tantalum pentoxide.

3. The process according to claim 1, wherein the first reducing agent or the second reducing agent is selected from the group consisting of yttrium, lanthanum, cerium, praseodymium, neodymium, samarium, europium and hydrides thereof 4. The process according to claim 1, wherein said magnesium alloy further comprises one or more elements selected from the group consisting of calcium, zinc and rare earth metals, in addition to magnesium.

5. The process according to claim 1, wherein before the first reduction step, the tantalum oxide powder is subjected to agglomeration.

6. The process according to claim 1, wherein before the third reduction step, the tantalum powder having high oxygen content is subjected to agglomeration.

7. The process according to claim 1, wherein the third reducing agent is magnesium, yttrium-magnesium alloy, calcium-magnesium alloy, lanthanum-magnesium alloy or magnesium-zinc alloy.

* * * * *